US010830356B2

(12) United States Patent
Swasey et al.

(10) Patent No.: US 10,830,356 B2
(45) Date of Patent: Nov. 10, 2020

(54) STATIC GASKET AND METHOD OF CONSTRUCTION THEREOF

(71) Applicant: FEDERAL-MOGUL LLC, Southfield, MI (US)

(72) Inventors: Thomas William Swasey, Okemos, MI (US); Edward Storrs Widder, Antioch, IL (US); Michael James Davidson, Ann Arbor, MI (US); Brent Sedlar, Dexter, MI (US); Jeri Lynn Cochran, Pinckney, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 16/132,888

(22) Filed: Sep. 17, 2018

(65) Prior Publication Data

US 2019/0017601 A1    Jan. 17, 2019

Related U.S. Application Data

(62) Division of application No. 15/274,783, filed on Sep. 23, 2016, now Pat. No. 10,007,840.

(60) Provisional application No. 62/232,997, filed on Sep. 25, 2015.

(51) Int. Cl.
*F02F 11/00* (2006.01)
*F16J 15/08* (2006.01)

(52) U.S. Cl.
CPC ......... *F16J 15/0818* (2013.01); *F02F 11/002* (2013.01); *F16J 15/0825* (2013.01); *F16J 2015/085* (2013.01)

(58) Field of Classification Search
CPC ................. F16J 15/0818; F16J 15/0825; F16J 2015/085; F16J 2015/0856; F02F 11/002
See application file for complete search history.

(56) References Cited

U.S. PATENT DOCUMENTS

| 1,478,108 A | | 12/1923 | Dieter | |
|---|---|---|---|---|
| 6,062,572 A | * | 5/2000 | Hasegawa | F16J 15/0818 277/592 |
| 6,073,938 A | * | 6/2000 | Abe | F16J 15/104 277/644 |

(Continued)

FOREIGN PATENT DOCUMENTS

| JP | S62224772 A | 10/1987 |
|---|---|---|
| JP | H0176544 U | 5/1989 |

(Continued)

*Primary Examiner* — Jun S Yoo
(74) *Attorney, Agent, or Firm* — Robert L. Stearns; Dickinson Wright, PLLC

(57) ABSTRACT

A metal static gasket and method of construction thereof is provided. The gasket includes at least one metal layer. The at least one metal layer has opposite sides with at least one through opening extending through the opposite sides configured to register with an opening to be sealed and at least one raised annular seal bead extending at least in part about the at least one through opening. At least one protrusion extends outwardly from at least one of the sides, wherein the at least one protrusion prevents complete flattening of the at least one seal bead. The at least one protrusion has a plurality of discrete layers of metal deposited on one another via an additive manufacture process, wherein the protrusion is formed having a hollow region extending therein.

9 Claims, 8 Drawing Sheets

(56) References Cited

U.S. PATENT DOCUMENTS

| | | | |
|---|---|---|---|
| 6,948,714 B1* | 9/2005 | Quick | F16J 15/0818 |
| | | | 277/592 |
| 2013/0323472 A1* | 12/2013 | Muller-Niehuus | C23C 4/02 |
| | | | 428/172 |
| 2014/0361495 A1 | 12/2014 | Swasey et al. | |
| 2016/0295807 A1* | 10/2016 | Law | A01G 9/025 |

FOREIGN PATENT DOCUMENTS

| | | |
|---|---|---|
| JP | H0371155 U | 7/1991 |
| JP | H0741138 U | 7/1995 |
| JP | H08210181 A | 8/1996 |
| JP | 2003502605 A | 1/2003 |

\* cited by examiner

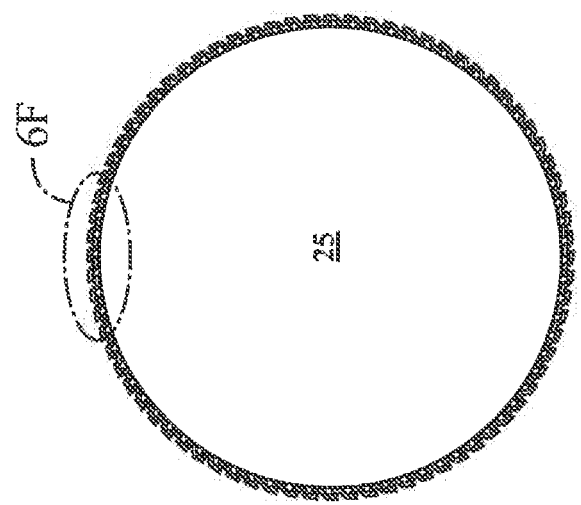
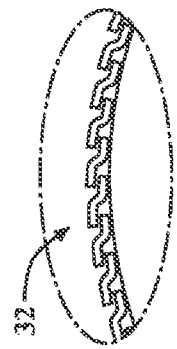
FIG. 6A  FIG. 6B
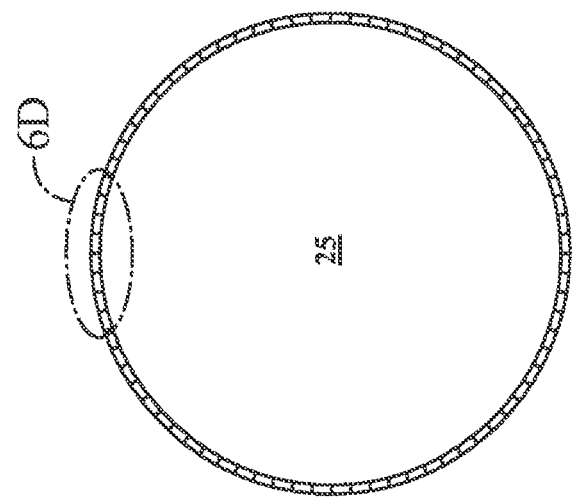
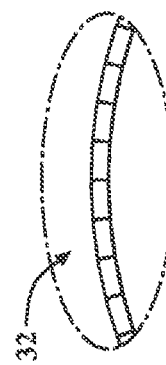
FIG. 6C  FIG. 6D
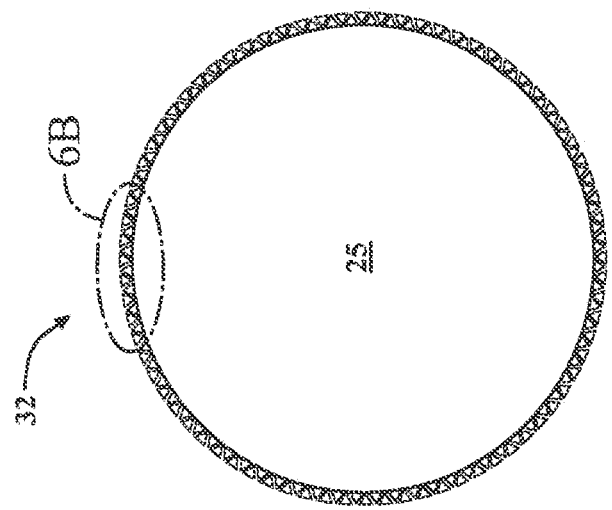
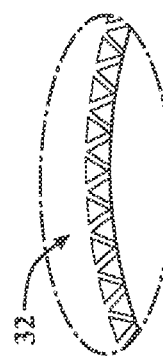
FIG. 6E  FIG. 6F

STATIC GASKET AND METHOD OF CONSTRUCTION THEREOF

CROSS-REFERENCE TO RELATED APPLICATION

This U.S. Divisional Application claims the benefit of U.S. Utility application Ser. No. 15/274,783, filed Sep. 23, 2016 and U.S. Provisional Application Ser. No. 62/232,997, filed Sep. 25, 2015, both of which are incorporated herein by reference in their entirety.

BACKGROUND OF THE INVENTION

1. Technical Field

This invention relates generally to static gaskets of the type used to establish a gas/fluid-tight seal between two members to be clamped together and to their method of construction.

2. Related Art

In establishing a gas/fluid-tight seal between two members to be clamped together, such as a cylinder head and engine block or an engine block and an exhaust manifold, it is common to use a static gasket having one or multiple layers. Generally, at least one of the layers of the multilayer gasket, sometimes referred to as an active or functional layer, has one or more seal beads to establish a gas/fluid tight seal about openings, such as cylinder bores, coolant openings, and/or bolt openings. Another of the layers, sometimes referred to as a distance layer, can be configured to abut the functional layer to facilitate setting a gap thickness which is needed to attain the desired compression ratio in a diesel engine, while also helping to establish the gas/fluid tight seal about the openings by limiting the compression of the seal beads of the functional layer.

To facilitate compressing the seal beads of the functional layers to the desired height, without over compressing the seal breads, the functional or distance layer, if provided, is typically formed having one or more raised protrusions formed within the material thereof. The raised protrusions are typically formed in a coining process via a high tonnage forming press. As such, the press plastically deforms the material of the respective layer to form the raised protrusions. Unfortunately, the high tonnage presses used to form the raised protrusions are very expensive, occupy of a large amount of space, and upon being setup, are dedicated to a specific size and pattern of raised protrusions, thereby requiring a great deal of time and effort to change from one pattern of raised protrusions to another. Further, as a result of plastically deforming the material of the active layer or distance layer, the material properties are altered in an unpredictable manner, thereby creating, within the material of the distance layer, unpredictable material properties, which ultimately can lead to premature failure of the distance layer's ability to function as intended. Further yet, having to mechanically upset the material of the active layer or distance layer typically results in the raised protrusions having shapes and sizes deviating from one another and from the shape and size actually desired, mainly due to tolerances within the layer material, as well as tolerances of the press and tools used to form the raised protrusions. Further yet, if the protrusions are formed in an active layer, further problems commonly arise as a result of the material typically being a high strength spring steel, such as FH 301 SS, for example, which is generally difficult to plastically deform in predictable fashion.

SUMMARY OF THE INVENTION

A metal static gasket is provided. The gasket includes at least one metal layer. The at least one metal layer has opposite sides with at least one through opening extending through the opposite sides configured to register with an opening and at least one raised annular seal bead extending about the at least one through opening. At least one protrusion extends outwardly from at least one of the sides, wherein the at least one protrusion prevents complete flattening of the at least one seal bead. The at least one protrusion has a plurality of discrete layers of metal deposited on one another via an additive manufacture process, wherein the protrusion is formed having a hollow region extending therein.

In accordance with another aspect of the invention, the at least one protrusion can be formed on a functional layer.

In accordance with another aspect of the invention, the at least one metal layer can include at least one metal functional layer having the at least one raised annular seal bead and a separate metal distance layer including a metal sheet with opposite sides, wherein the at least one protrusion can be bonded to at least one of the sides of the functional layer or the distance layer to prevent over-compression of the at least one seal bead.

In accordance with another aspect of the invention, the at least one protrusion can be formed as a plurality of protrusions spaced from one another.

In accordance with another aspect of the invention, the at least one protrusion can be provided as a plurality of protrusions, with at least some of the protrusions differing in height from one another.

In accordance with another aspect of the invention, the at least one protrusion can be provided as a plurality of protrusions, with at least some of the protrusions differing in peripheral shape from one another.

In accordance with another aspect of the invention, the at least one protrusion can be provided as a plurality of protrusions, with at least some of the protrusions differing in density from one another.

In accordance with another aspect of the invention, the at least one protrusion can be provided as a plurality of protrusions, with at least some of the raised protrusions differing in material from one another.

In accordance with another aspect of the invention, at least some of the discrete layers can be provide having a different density from one another.

In accordance with another aspect of the invention, at least some of the discrete layers can be formed of different materials from one another.

In accordance with another aspect of the invention, at least one of the hollow regions can be fully encapsulated by the discrete layers.

In accordance with another aspect of the invention, at least one of the protrusions can have a recess or recesses depending into an upper surface thereof.

In accordance with another aspect of the invention, the at least one protrusion can be provided having an asymmetrical shape as viewed in lateral cross-section.

In accordance with another aspect of the invention, the at least one protrusion can have a varying cross-sectional shape as viewed in lateral cross-section.

In accordance with another aspect of the invention, the at least one protrusion can have a constantly varying cross-sectional shape as viewed in lateral cross-section.

In accordance with another aspect of the invention, the functional layer and the distance layer have a plurality of openings registered with one another and the functional layer and/or the distance layer is provided with the at least one protrusion extending about at least a portion of each of the registered openings.

In accordance with another aspect of the invention, the gasket can be constructed as a cylinder head gasket.

In accordance with another aspect of the invention, the gasket can be constructed as an exhaust manifold gasket.

In accordance with another aspect of the invention, a method of constructing a gasket is provided. The method includes providing at least one metal layer having at least one raised annular seal bead extending at least in part about an opening to be sealed with at least one of the metal layers having opposite sides. The method further includes forming at least one metal protrusion by applying discrete layers of metal on one another in an additive manufacturing process, and fixing the at least one metal protrusion on at least one side of the at least one metal layer, and further yet, forming a hollow region in the at least one metal protrusion while forming the at least one protrusion.

In accordance with another aspect of the invention, the method can include fixing the at least one protrusion directly onto the metal layer via a welding, clinching, riveting, adhesive, or eyelets.

In accordance with another aspect of the invention, the method can include forming the gasket from a single metal layer and forming both the annular seal bead therein and fixing the at least one protrusion thereto.

In accordance with another aspect of the invention, the method can include forming a functional layer of the gasket having the at least one annular seal bead formed therein and having a separate distance layer, and fixing a plurality of the metal protrusions to at least one of the functional layer and the distance layer.

In accordance with another aspect of the invention, the method can include forming the at least one protrusion as a plurality of protrusions, and forming at least some of the protrusions having differing heights from one another.

In accordance with another aspect of the invention, the method can include forming the at least one protrusion as a plurality of protrusions, and forming at least some of the protrusions having differing types of material from one another.

In accordance with another aspect of the invention, the method can include forming the at least one protrusion as a plurality of protrusions, and forming at least some of the protrusions differing in peripheral shape from one another.

In accordance with another aspect of the invention, the method can include forming the at least one protrusion as a plurality of protrusions, and forming at least some of the protrusions differing in density from one another.

In accordance with another aspect of the invention, the method can include forming at least some of the discrete layers from a different material from one another.

In accordance with another aspect of the invention, the method can include forming an external recess in the at least one protrusion.

In accordance with another aspect of the invention, the method can include forming the hollow region as being fully encapsulated by the discrete layers.

In accordance with another aspect of the invention, the method can include forming the hollow region as extending through the discrete layers as a through channel.

In accordance with another aspect of the invention, the method can include forming at least one of the at least one protrusion having an asymmetrical shape as viewed in lateral cross-section.

In accordance with another aspect of the invention, the method can include forming at least one of the at least one protrusion having a varying cross-sectional shape as viewed in lateral cross-section.

In accordance with another aspect of the invention, the method can include forming at least one of the at least one protrusion having a constantly varying cross-sectional shape as viewed in lateral cross-section.

In accordance with another aspect of the invention, the method can include forming a functional layer and a distance layer having a plurality of openings registered with one another and forming the functional layer and/or the distance layer having a plurality of the protrusions extending about at least a portion of each of the registered openings.

In accordance with another aspect of the invention, the method can include forming the gasket as a cylinder head gasket.

In accordance with another aspect of the invention, the method can include forming the gasket as an exhaust manifold gasket.

By being able to form the protrusions of the metal gasket layer as a plurality of stacked, discrete layers in an additive manufacturing process, any number of complex configurations or arrays of the protrusions can be formed, and it is anticipated that additive manufacturing manufacturing processes develop, the process will be made to allow the protrusions to be formed quickly and inexpensively in comparison to trying to upset material of the metal gasket layer to form stoppers. Further yet, the setup process used to construct the metal gasket layer having the protrusions is quick and can be readily changed to form different patterns of protrusions, as desired, without undue tooling expense and expenditure of time.

BRIEF DESCRIPTION OF THE DRAWINGS

These and other aspects, features and advantages of a gasket constructed in accordance with the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
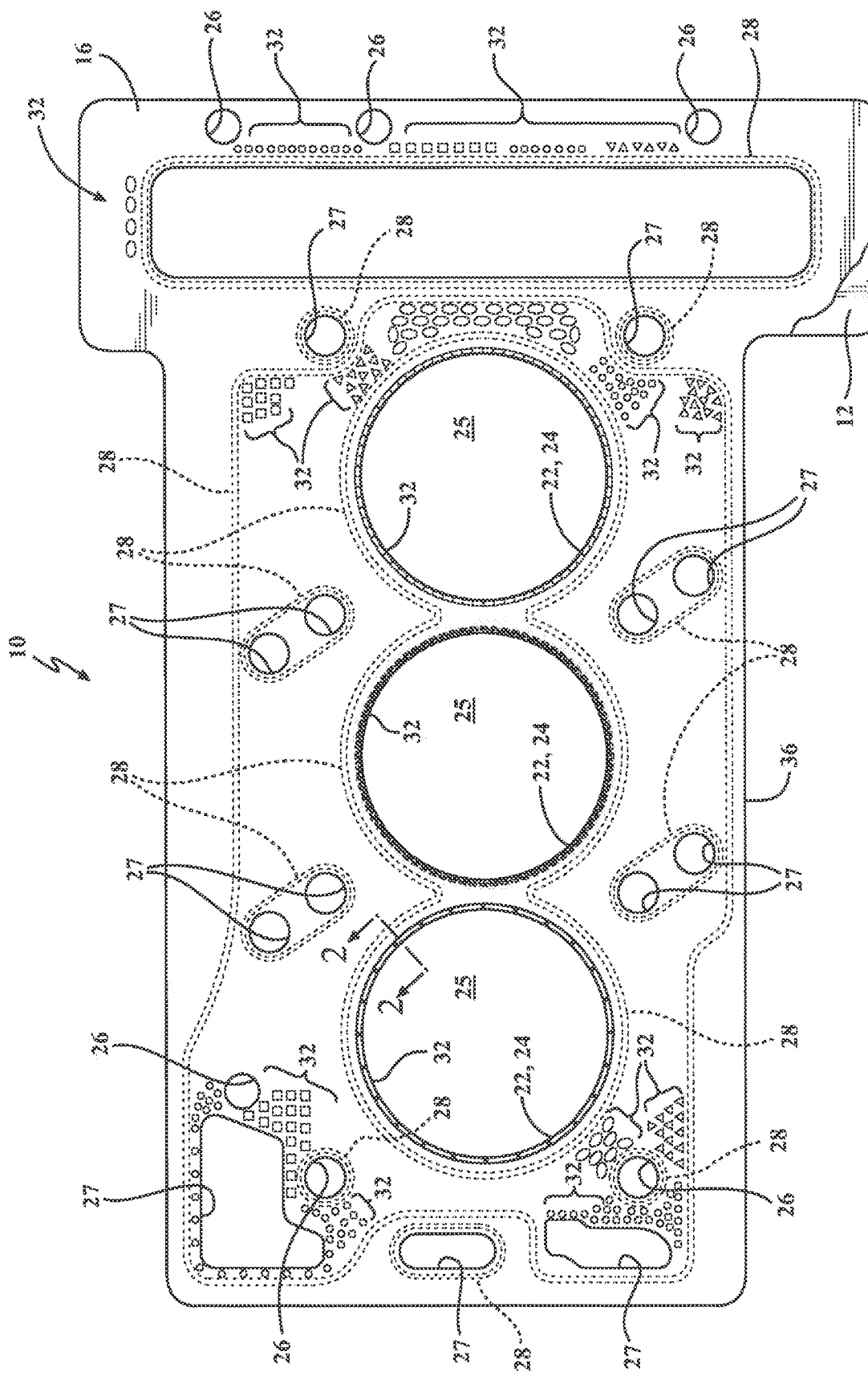
FIG. 1 is a partially broken away plan view of a multilayer gasket constructed in accordance with various aspects of the invention.
Figure 2:
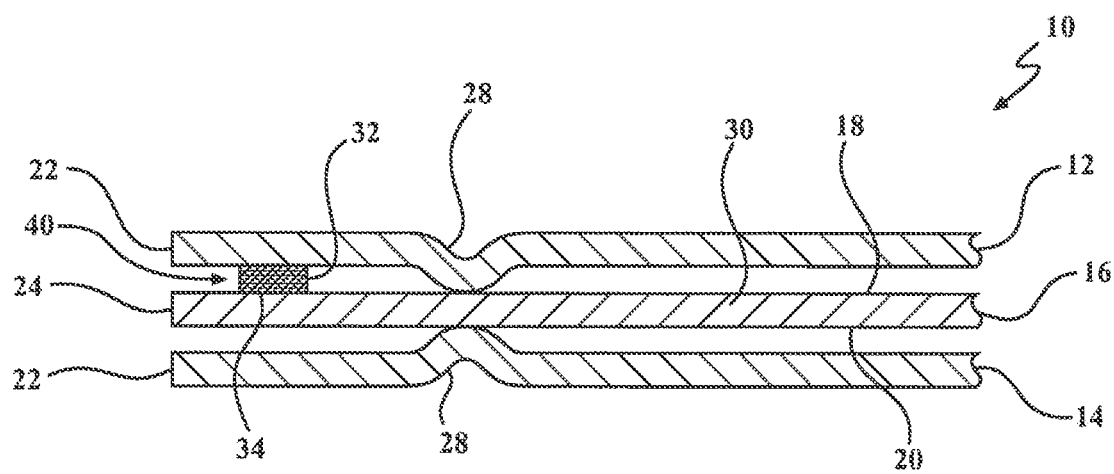
FIG. 2 is a partial cross-sectional view of the gasket of FIG. 1 taken generally along the line 2-2.
Figure 5A:
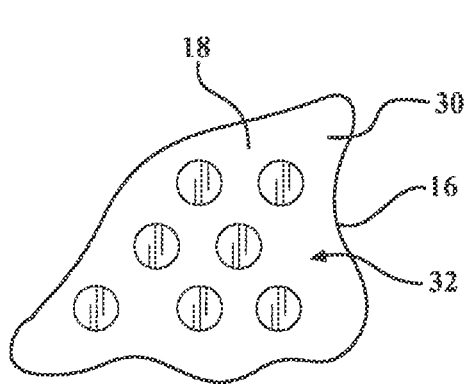
FIGS. 5A-5D show plan views of a portion of a distance layer constructed in accordance with further aspects of the invention.
Figure 5B:
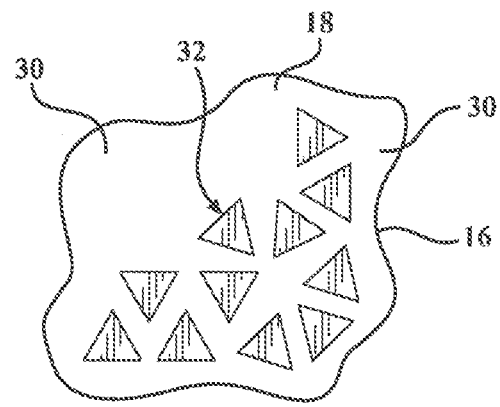
Figure 5C:
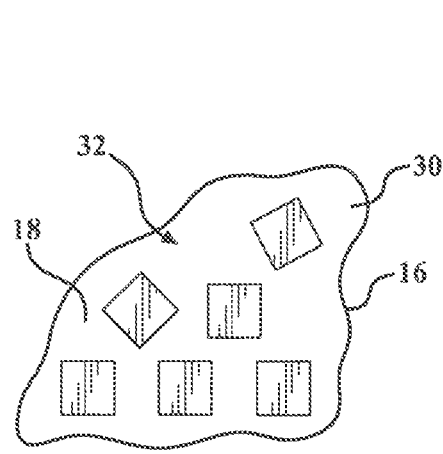
Figure 5D:
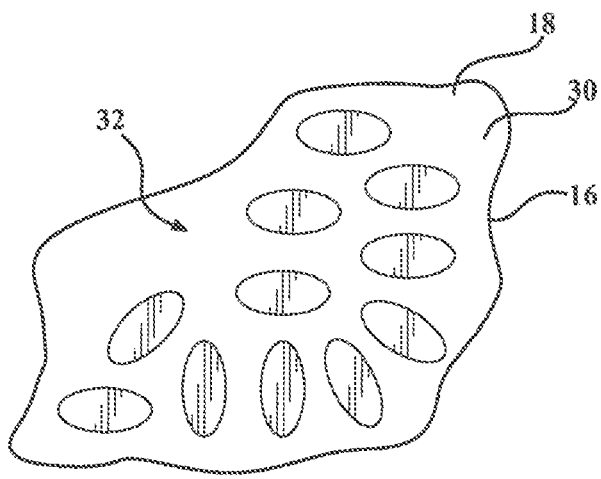

Referring in more detail to the drawings, FIG. 1 illustrates a schematic plan view of a gasket 10 constructed in accordance with various aspects (multiple embodiments represented in single view) of the invention, shown, by way of example and without limitation as a multilayer gasket, referred to hereafter simply as gasket. The gasket 10 can be constructed as a cylinder head gasket for receipt between an engine block and a cylinder head (not shown) of a gas or diesel engine, though other sealing applications are contemplated, such as an exhaust manifold gasket, by way of example and without limitation. The gasket 10 has at least one functional layer, represented here by way of example and without limitation as having a pair of functional layers 12, 14 (FIG. 2), and also shown here, again by way of example and without limitation, as having a distance layer 16. It is to be recognized that gaskets not having a distance layer are contemplated herein, as discussed in further detail below. The functional layers 12, 14 are arranged to abut opposite sides 18, 20 of the distance layer 16, such that the distance layer 16 is sandwiched between the functional layers 12, 14. The individual layers 12, 14, 16 can remain separate from one another or be fixed to one another, such as by a weld joint, clinch or rivet (not shown), such as at an outermost periphery of the gasket 10. The functional layers 12, 14 each have an opening 22 sized and located to register with an opening 24 in the distance layer 16, wherein the respective openings 22, 24 are each registered with one another and with a through bore, such as a cylinder bore 25. In addition, the functional layers 12, 14 and distance layer 16 have a plurality of additional openings registered with one another, such as in a backland region (radially outward from bore 25 and near outer periphery) of the gasket 10 having bolt openings 26 and coolant or oil passages 27, by way of example and without limitation. The functional layers 12, 14 each have one or more compression beads, such as half and/or full compression seal beads 28 extending outwardly from a flat or substantially flat plane of the layers 12, 14 to facilitate establishing a gas-tight seal about the cylinder bore 25 and other openings 26, 27. To further facilitate forming a good and reliable gas/fluid-tight seal about the cylinder bore 25 and remaining registered openings 26, 27, the distance layer 16 and/or at least one of the functional layers 12, 14, and shown in FIG. 2 as the distance layer 16 having a planar body 30 constructed from a planar metal sheet having the opposite sides 18, 20, includes at least one, and shown as a plurality of individual raised stoppers, also referred to as protrusions 32, extending upwardly and outwardly from at least one of its sides 18, 20 to prevent an over-compression, complete flattening of the seal beads 28. The protrusions 32 can be formed in an additive manufacturing process (discrete layers of material are built on top of one another, as discussed further herein), such as in a thermal spraying, cold spraying, metal spraying, screen printing, wire feed, particulate spraying, or 3-D printing process, for example, with 3-D printing being referenced hereafter, by way of example and without limitation, with the other additive processes mentioned being fully contemplated herein, as separate pieces rigid metal material from the respective layer to which they are attached, whether to one or both of the functional layers 12, 14 and/or the distance layer 16. The protrusions 32 are shown in FIG. 2 as being fixed to a metal sheet body 30 of the distance layer 16, by way of example and without limitation, and can be fixed to the metal sheet 30 via clinching, welding, rivets, eyelets, or an adhesive, which effectively form bond joints 34 between the protrusions 32 and the metal sheet body 30. In addition to forming the protrusions 32 as separate pieces of 3-D printed material first, and then fixing the protrusions 32 to the respective layer(s) 12, 14, 16, the protrusions 32 can be 3-D printed directly on the respective layer(s) 12, 14, 16, and shown as being formed on the metal sheet body 30, thereby doing away with the need for subsequent, secondary fixing processes. The protrusions 32 prevent the seal beads 28 extending about the cylinder bore 25 and in the backland region from being completely flattened upon fastening the cylinder head (not shown) to the engine block (not shown). As such, the seal beads 28 are assured of maintaining a generally constant, high sealing pressure against the distance layer 16 relative to the remaining portions of the functional layers 12, 14, thereby providing and maintaining a gas/fluid-tight seal about the cylinder bore 25 and other registered openings 26, 26.

The functional layers 12, 14 are constructed from a resilient metal, such as spring steel, for example, and can be provided having a thickness of about 0.1 to 0.3 mm, by way of example and without limitation. The functional layers 12, 14 can be constructed having mirrored profiles across the distance layer 16, with each having the aforementioned seal beads, such as full seal beads 28 adjacent the cylinder bore 26 and half beads 28 extending in the backland region to an outer periphery portion 36, such as may provide a fluid-tight seal adjacent oil or coolant passage 27, for example. Of course, as mentioned above and discussed further below, the protrusions 32 can be 3-D printed directly on the functional layers 12, 14 if desired for the intended application, particularly in those engine/exhaust applications not having a distance layer.

The metal body 30 and protrusions 32 can be constructed from similar or dissimilar metal materials, such as cold rolled steel or stainless steel, respectively, by way of example and without limitation. The distance layer 16 can be constructed having any desired outer peripheral shape, as needed to conform to the mating cylinder head and engine block. Similarly, the protrusions can be 3-D printed to have any desired height (H) and outer peripheral shape, depending on the precise load characteristics sought, which is greatly facilitated as a result of forming the protrusions 32 via an additive manufacturing process.

Upon determining the structural characteristics desired for the gasket 10, the 3-D printed protrusions 32, having the desired height (H) or heights (H) and outer peripheral shape or shapes, can be positioned on the respective layer to which they are intended to be attached, shown as the distance layer sheet 30, by way of example and without limitation, in precise desired locations and fixed in position to the body 30 via the bond joints 34. It is contemplated that the optimal bonding process includes using a surface mount technology including a galvanometer laser welding process (galvo laser) and sintering process to form the welded bond joints 34 to fix the protrusions 32 in their precise locations, though other suitable bonding processes are contemplated to be within the scope of the disclosure, such as any suitably strong metal adhesive, for example. The welding process not only precisely locates the protrusions 32, but also assures that the protrusions 32 retain their precise height (H) and peripheral shape without being deformed or otherwise altered, thereby retaining their rigidity and profile to provide the intended compression loading across the gasket layers 12, 14, 16 in use. Accordingly, the compression loading across the gasket 10 can be precisely controlled and distributed to account for any deflections anticipated in use, whether due to fasteners or expansion/contraction resulting from thermal affects. In addition to providing the ability to produce a gasket with precise loading characteristics, the galvo laser welding process is readily adaptable to make quick changes from one gasket platform to another, and thus, is economical. Further economies are recognized by the speed with which the high speed galvo laser welding process can be performed, wherein it is contemplated that up to about 125,000 protrusions 32 or more can be welded per hour on a single high speed galvo laser welding apparatus. As such, the individual 3-D printed protrusions 32 fixed to each distance layer sheet 30 are fixed at substantially the same time with one another. Of course, it is to be recognized that the 3-D printed protrusions 32 can be formed directly onto the desired surface in the desire location via the selected additive manufacturing process, thereby doing away with the need for any subsequent, secondary fixing processes.

Figure 3:
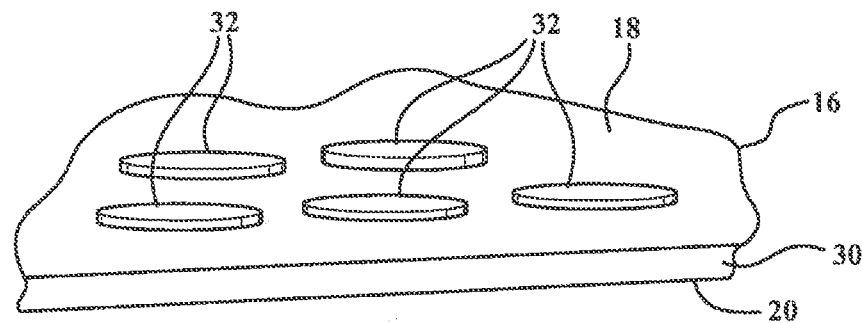
FIG. 3 is a partial perspective view of a distance layer constructed in accordance with one aspect of the invention.
Figure 3A:
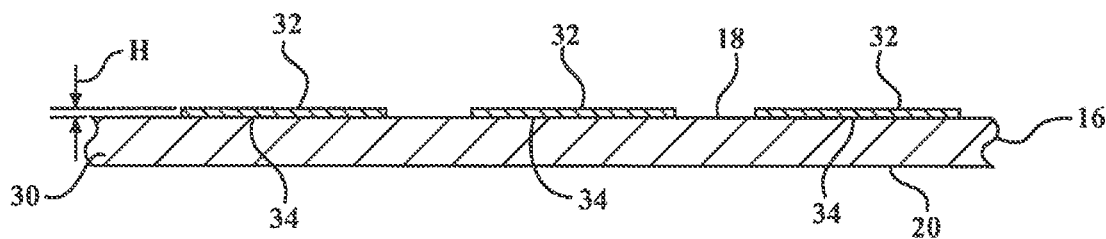
FIG. 3A is a cross-sectional side view of the layer of FIG. 3.
Figure 4:
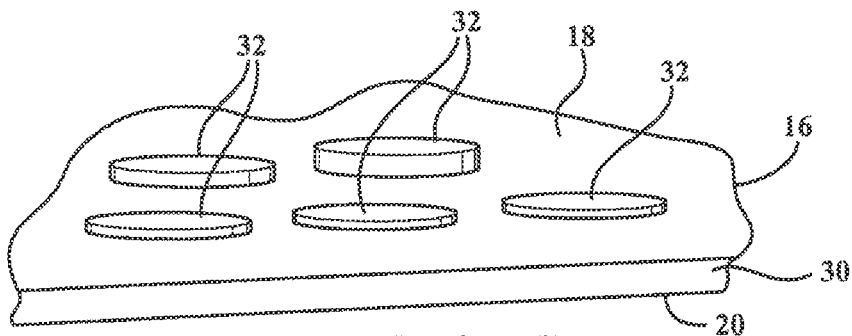
FIG. 4 is a partial perspective view of one of a distance layer constructed in accordance with another aspect of the invention.
Figure 4A:
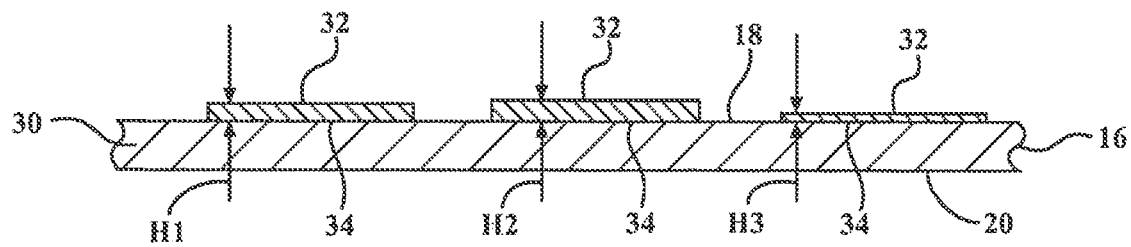
FIG. 4A is a cross-sectional side view of the layer of FIG. 4.

As shown in FIGS. 3 and 3A, the protrusions 32 can be printed having a plurality of discrete layers build on one another, such that the protrusions have the same height (H) within a particular region of the functional layer 12, 14 and/or distance layer 16 (as shown) or across the full functional layer 12, 14 and/or distance layer 16, or as shown in FIGS. 4 and 4A, the protrusions 32 can be printed having a plurality of discrete layers build on one another, such that at least some of the protrusions 32 have different heights (H1, H2, H3) from one another within a desired region of the functional layer 12, 14 and/or distance layer 16 (as shown). Further, as shown in FIGS. 5A-5D, the protrusions 32 can be printed having any desired outer peripheral shape, shown as being round, triangular, square and oval, by way of example and without limitation. Of course, it should be recognized that any combination of height (H) and peripheral shape of protrusions 32 can be printed at any desired location on the functional layer 12, 14 and/or distance layer body 30. As such, a precise pattern and configuration of protrusions 32 can be formed across the gasket 10 to provide the desired load distribution throughout the gasket 10, knowing the anticipated performance characteristics, e.g. clamping threes, thermal affects, and engine distortion, in the given application.

Figure 6G:
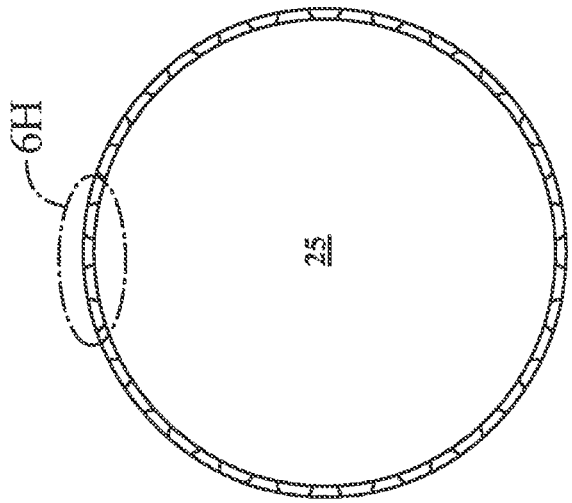
FIGS. 6A-6R show plan views and respective enlarged views of a portion of one of a functional layer or a distance layer constructed in accordance with further aspects of the invention.
Figure 6H:
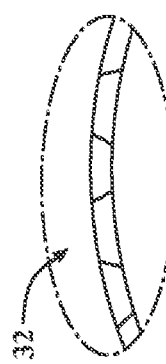
Figure 6I:
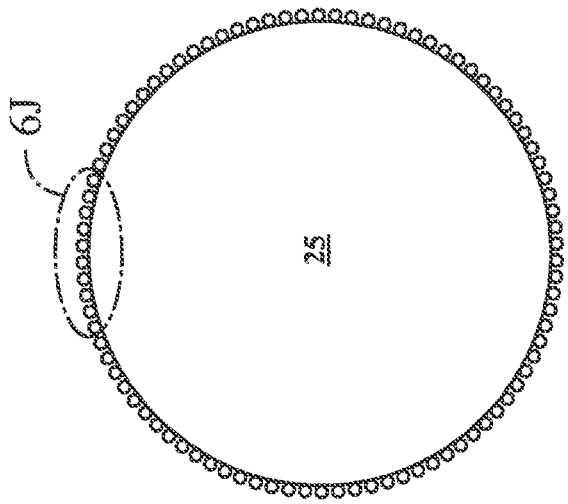
Figure 6J:
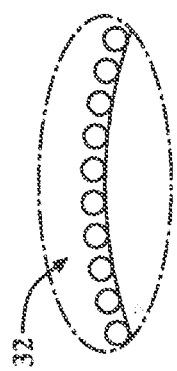
Figure 6K:
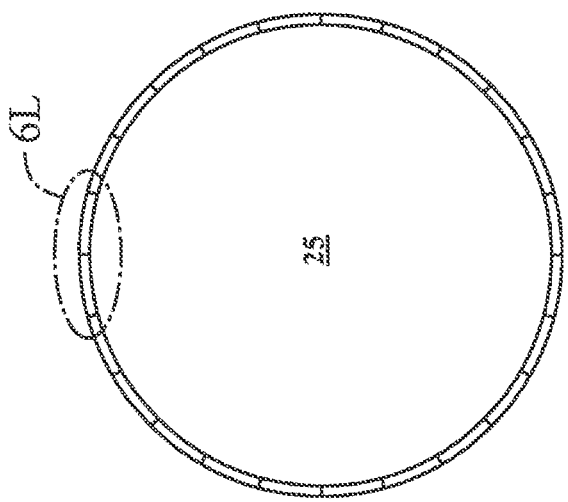
Figure 6L:
Figure 6M:
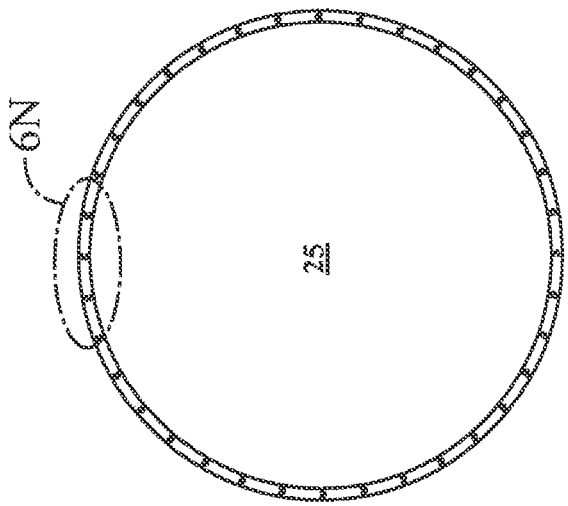
Figure 6N:
Figure 6O:
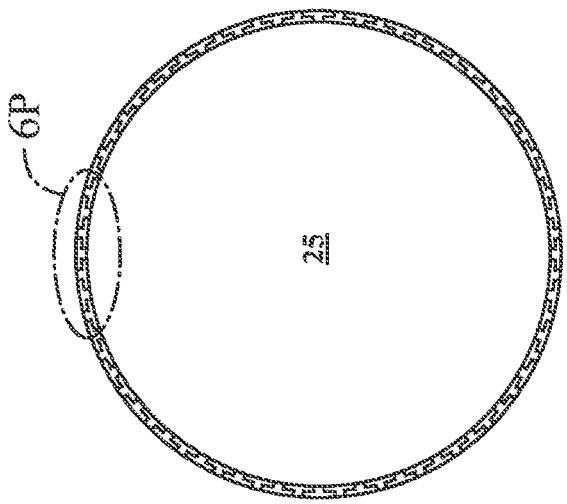
Figure 6P:
Figure 6Q:
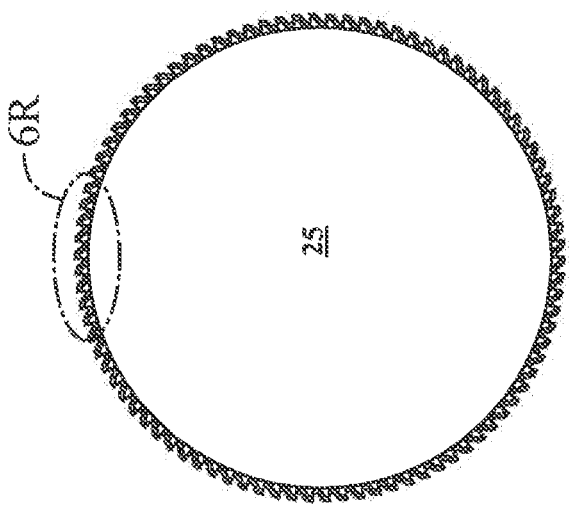
Figure 6R:
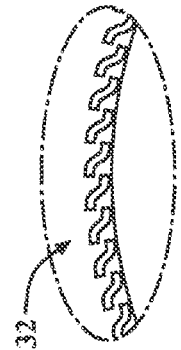
Figure 7:
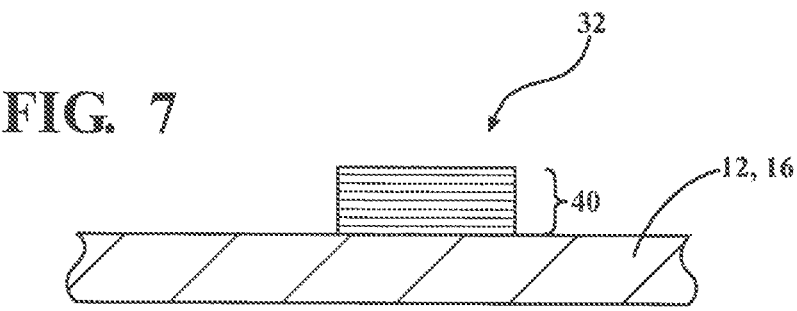
FIG. 7 shows a cross-sectional view taken through one of a functional layer or a distance layer having a protrusion fixed thereto in accordance with another aspect of the invention.
Figure 8:
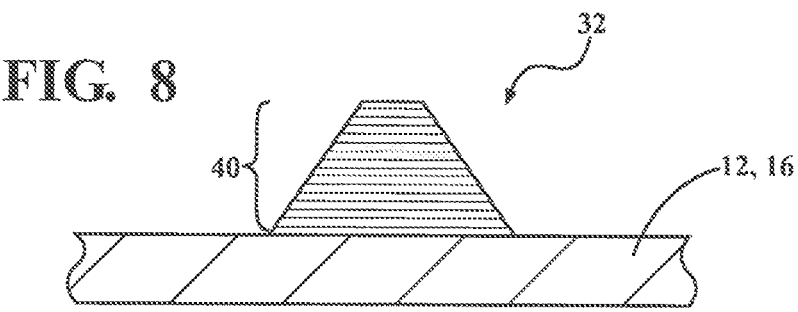
FIG. 8 shows a cross-sectional view taken through one of a functional layer or a distance layer having a protrusion fixed thereto in accordance with another aspect of the invention.
Figure 8A:
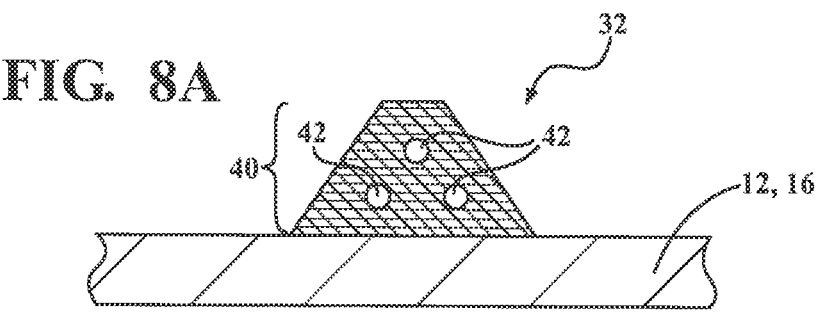
FIG. 8A shows a cross-sectional view taken through the protrusion of FIG. 8.
Figure 9:
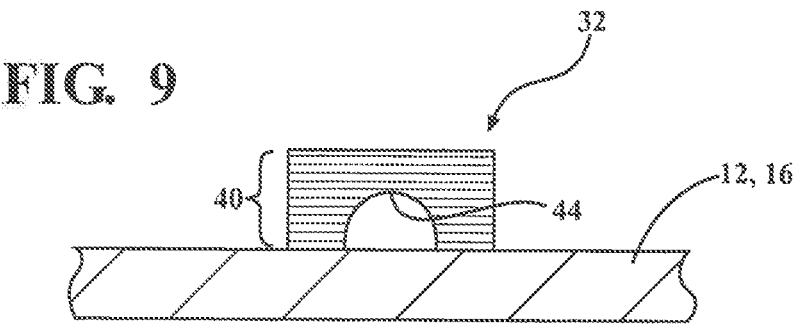
FIG. 9 shows a cross-sectional view taken through one of a functional layer or a distance layer having a protrusion fixed thereto in accordance with another aspect of the invention.
Figure 10:
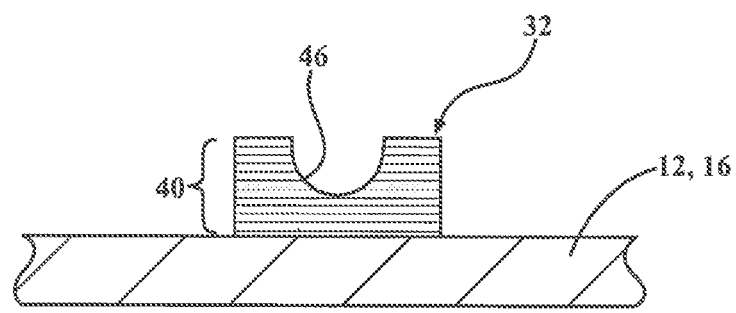
FIG. 10 shows a cross-sectional view taken through one of a functional layer or a distance layer having a protrusion fixed thereto in accordance with another aspect of the invention.

In FIGS. 6A-6R, a variety of additional shapes of protrusions 32 are shown fixed about the cylinder bore 25. As such, it can be seen that virtually any desired configuration of protrusion 32 can be printed onto the metal layer, as desired, particularly given the ability to print and fix each protrusion 32 on the body 30 separately from one another via the individual bond joints 34. Further, as shown in FIG. 7, the printed protrusions 32 can be formed having individual, discrete printed layers 40 built on and bonded to one another, wherein at least one of the layers 40 can be formed having a different density from other layers 40, and further yet, selected individual layers 40 can be printed of different materials from one another. In addition, as shown in FIGS. 8 and 8A, one or more of the protrusions 32 can be printed having a hollow region, shown as an internal, encapsulated channel, void or voids 42, as desired, wherein the hollow region(s) can be formed to provide the protrusion 42 with the desire rigidity, while at the same time minimizing the amount of material needed to form the protrusion 32. Further yet, as shown in FIG. 9, one or more of the protrusions 32 can be formed with the layers forming a hollow region, shown as an internal pocket, through passage, or channel 44, or, as shown in FIG. 10, the layers can be printed to form an external, exposed pocket or annular channel 46. Each of the aforementioned configurations is made possible as a result of building the individual, discrete layers 40 via the additive manufacturing process (3-D printing process, for example), with each subsequently formed layer 40 contributing to the desired shape and configuration of the protrusion 32.

Figure 11:
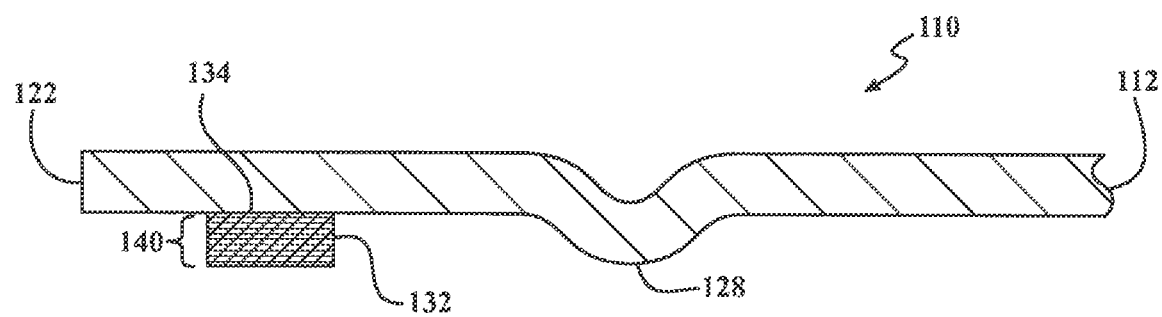
FIG. 11 is a view similar to FIG. 2 of a functional layer of a gasket constructed in accordance with another aspect of the invention.

In FIG. 11, a gasket 110 constructed in accordance with another aspect of the invention is shown, wherein the same reference numeral are used as above, offset by a factor of 100, to identify like features.

Figure 12:
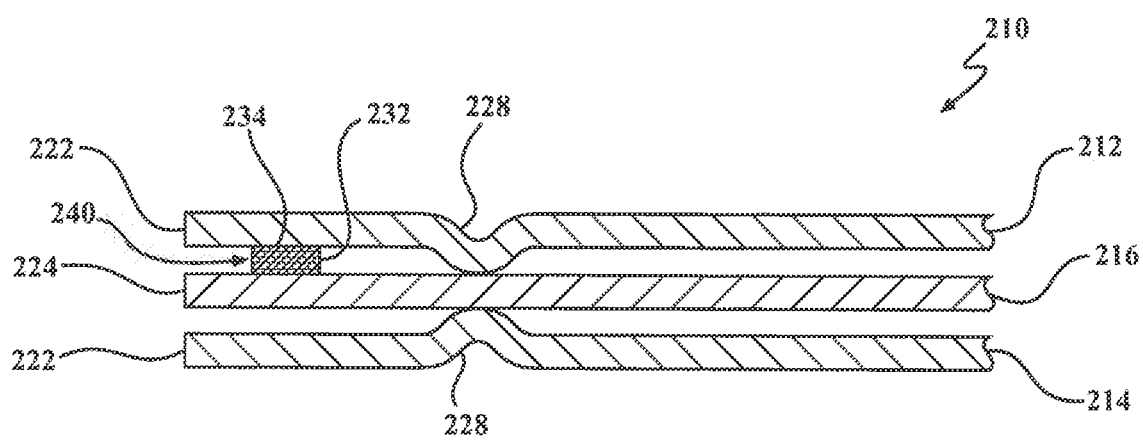
FIG. 12 is a view similar to FIG. 2 of a functional layer of a gasket constructed in accordance with yet another aspect of the invention.

The gasket 110 is formed as a single metal layer, functioning as both a functional layer 112 having one or more compression beads, such as half and/or full compression seal heads 128 to facilitate establishing a fluid/gas-tight seal about an opening to be sealed, as discussed above, and further includes at least one or a plurality of individual raised stoppers, also referred to as protrusions 132, extending upwardly and outwardly from at least one of its sides to prevent an over-compression, flattening of the seal beads 128. As discussed above with regard to the protrusions 32, the protrusions 132 are formed via an additive manufacturing process, e.g. 3-D printing, either directly onto the functional layer 112, or they are 3-D printed as separate pieces and then subsequently fixed to the functional layer 112 via a bond joint 134, as discussed above. The protrusions 132 are thusly formed of individual, discrete layers 140 built on one another, as desired, to function as discussed above to prevent the seal beads 128 from being completely flattened upon fastening the members in clamped relation with one another. It should be recognized that the functional layer 112 can be used by itself, or with other functional layers and/or with a distance layer, whether flat or having protrusions 32, 132, as discussed above, such as shown in FIG. 12, wherein a gasket 210 is shown constructed in accordance with another aspect of the invention, wherein the same reference numerals are used as above, offset by a factor of 200, to identify like features. The gasket 210 is structurally similar to the gasket 10, including protrusions 232 built of a plurality of layers 240; however, rather than the 3-D printed protrusions 232 being bonded to the distance layer 216, the protrusions 232 are bonded to at least of the functional layers 212, 214, and are shown as being bonded to the functional layer 212 via a bond joint 234 to prevent over-compression of the seal bead 228.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A method of constructing a gasket, comprising:
   providing at least one metal layer;
   forming at least one metal protrusion on at least one side of the at least one metal layer by applying discrete layers of metal on one another in an additive manufacturing process; and
   forming an internal void in said at least one metal protrusion.

2. The method of claim 1 further including forming said at least one metal protrusion as a plurality of protrusions and forming at least some of the protrusions differing in height from one another.

3. The method of claim 1 further including forming said at least one metal protrusion as a plurality of protrusions and forming at least some of the protrusions differing in peripheral shape from one another.

4. The method of claim 1 further including forming said at least one metal protrusion as a plurality of protrusions and forming at least some of the protrusions differing in density from one another.

5. The method of claim 1 further including forming said at least one metal protrusion as a plurality of protrusions and forming at least some of the protrusions differing in material from one another.

6. The method of claim 1 further including forming at least some of the discrete layers having a different density from one another.

7. The method of claim 1 further including forming at least some of the discrete layers of different materials from one another.

8. The method of claim 1 further including forming the internal void as being fully encapsulated by the discrete layers.

9. The method of claim 1 further including forming the internal void as extending through the discrete layers to form a through channel.

* * * * *